Sept. 2, 1958 B. P. FRANKLIN 2,850,712
MEANS FOR CONNECTING ELECTRODES TO CONDUCTORS
Filed Feb. 2, 1956 2 Sheets-Sheet 1
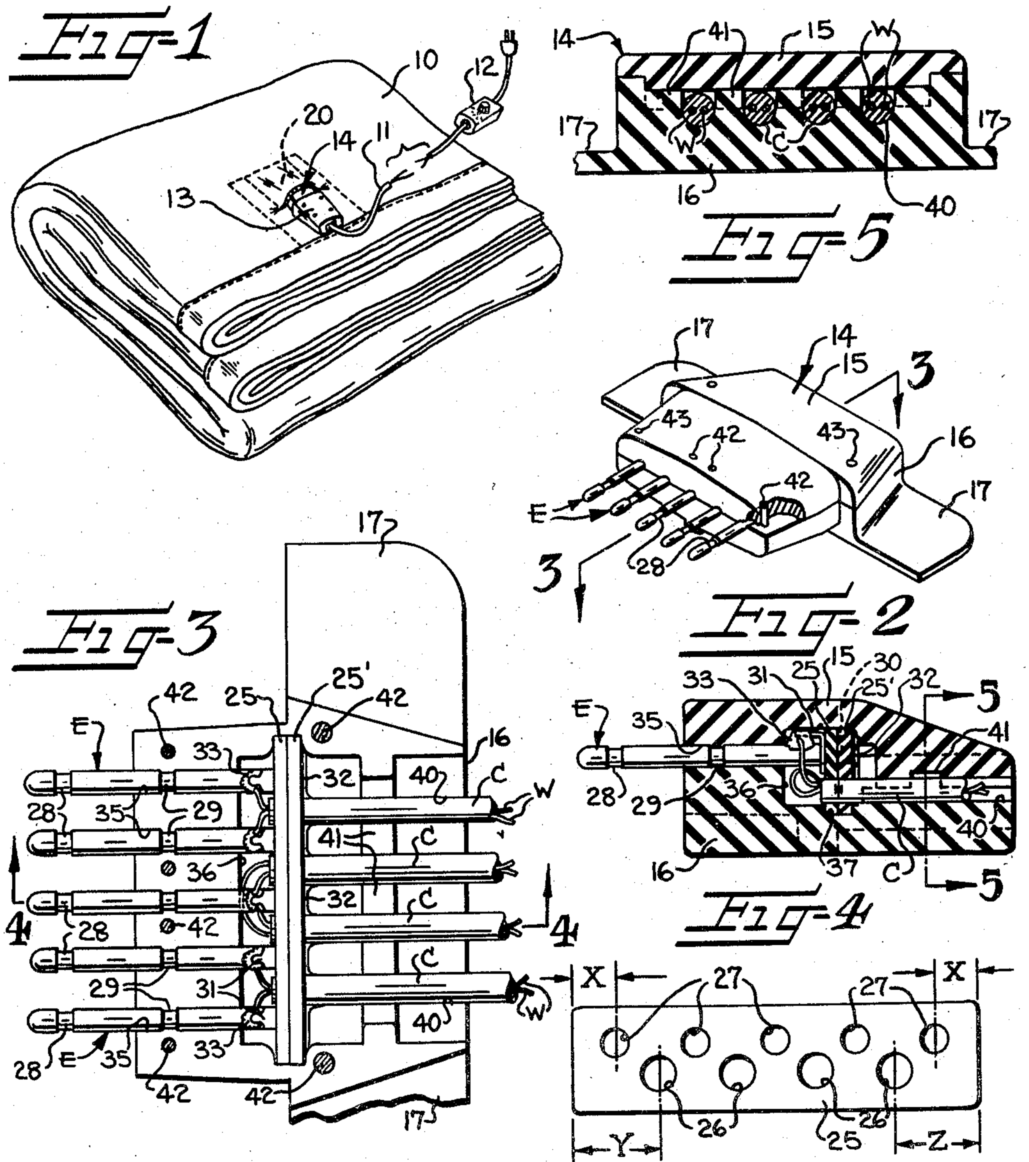
FIG-1, FIG-5, FIG-2, FIG-3, FIG-4
FIG-6
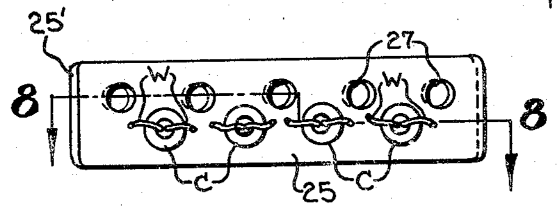
FIG-7
BURTON P. FRANKLIN, INVENTOR
BY Eaton + Bell
ATTORNEYS Sept. 2, 1958 B. P. FRANKLIN 2,850,712

MEANS FOR CONNECTING ELECTRODES TO CONDUCTORS

Filed Feb. 2, 1956 2 Sheets-Sheet 2

BURTON P. FRANKLIN,
INVENTOR

BY Eaton & Bell

ATTORNEYS

United States Patent Office 2,850,712

Patented Sept. 2, 1958

2,850,712

MEANS FOR CONNECTING ELECTRODES TO CONDUCTORS

Burton Philip Franklin, Leaksville, N. C., assignor, by mesne assignments, to The New York Trust Company, a corporation of New York, and John H. Baile, Saddle River, N. J., as trustees Application February 2, 1956, Serial No. 563,031

4 Claims. (Cl. 339—103)

This invention relates to an improved means and method for connecting insulated wires or resilient cables with rigid conductors to form a novel strain relief. This invention is particularly adapted for use in connection with wired fabrics such as those employed in the manufacture of electrically heated blankets, pads and the like and is particularly concerned with means for connecting resilient covered wires, with no particular strength in themselves, or resiliently encased wires to rigid conductors or electrodes for making electrical connections for an attachment cord adapted to be connected with a power supply.

It is an object of this invention to provide an improved method of making an electrical connector provided with a strain relief wherein only a very few parts are used and which parts can be quickly and easily assembled and manufactured.

It is another object of this invention to provide an improved method and means for connecting wires, each having a resilient covering thereon, to rigid terminal pins, electrodes or conductors wherein a pair of similar non-conductive relatively thin clamping plates are used and are each provided with first and second sets of holes therethrough which sets of holes are each arranged in a row and includes at least two holes. The holes in the first set are each of a size for snugly receiving a terminal pin or electrode and each of the holes in the second set are of a size for snugly receiving a corresponding end of a resilient cable with one or more wires therein adapted to be connected to adjacent terminal pins.

The first and second sets of holes in the connector plates are so arranged that, when the second sets of holes in the two plates are alined, the holes of the first set in one of the plates are off-set relative to the holes of the first set in the other plate. At this time, terminal ends of the cables are inserted through the second sets of holes in both plates with the proximal surfaces of the plates being disposed in juxtaposition. Thereupon, the plates are moved relative to each other to aline the first sets of holes in the two plates with each other to off-set or "pinch" the cables at the junctions of the two plates. Terminal pins are then inserted through and secured in the first sets of holes in both plates to maintain the first sets of holes in both plates in alinement and to thereby clamp the cables to the plates. Thereafter, the wires extending out of the free ends of the cables are connected to corresponding terminal pins and the strain relief unit thus formed is secured in a terminal cap housing.

Some of the objects of the invention having been stated, other objects will appear as the description proceeds when taken in connection with the accompanying drawings, in which—

Figure 1 is a perspective view illustrating the present invention as applied to an electric blanket and showing the terminal cap of the present invention with a mating terminal cap connected thereto and having a cord leading therefrom to a control unit plug adapted to be connected to a source of current;

Figure 2 is an enlarged isometric view of the improved terminal cap removed from the blanket;

Figure 3 is an enlarged plan view, partially in section, taken substantially along line 3—3 in Figure 2;

Figure 4 is a longitudinal vertical sectional view taken substantially along line 4—4 in Figure 3, but showing both the upper and lower body sections of the terminal cap in association therewith;

Figure 5 is a transverse vertical sectional view taken substantially along line 5—5 in Figure 4;

Figure 6 is an elevation of one of the strain relief clamping plates or connector plates illustrating the relationship between the two rows or sets of holes formed therein;

Figure 7 is a view similar to Figure 6 showing the relationship between the electrode-receiving holes of the two connector plates when the cable receiving holes in the two plates are alined and showing the ends of cables inserted in the latter holes;

Figure 8:
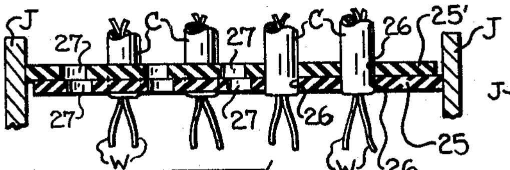
Figure 8 is a sectional plan view taken substantially along line 8—8 in Figure 7 and showing the two connecting plates positioned between the jaws of a clamping device such as a vise.
Figure 9:
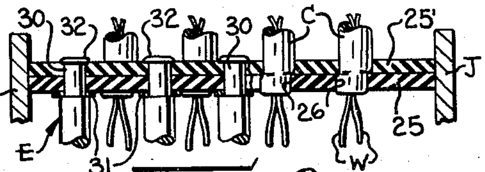
Figure 10:
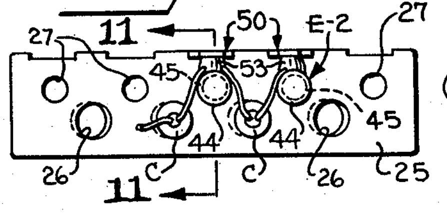
Figure 11:
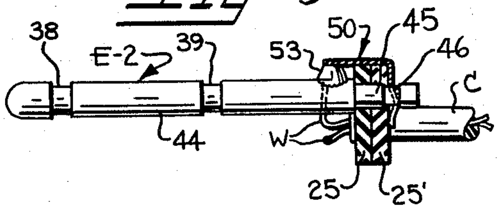
Figure 12:
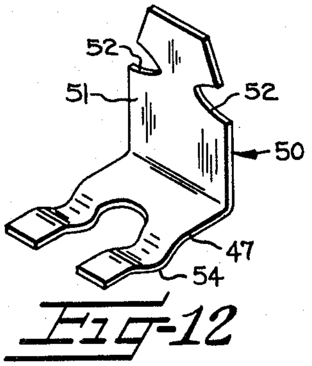
Figure 13:
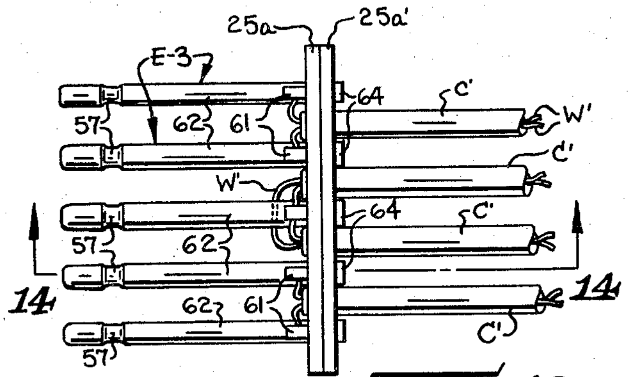
Figure 15:
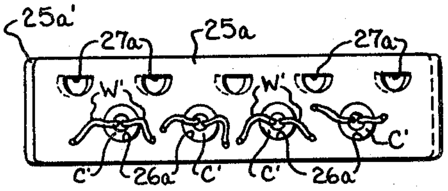
Figure 14:
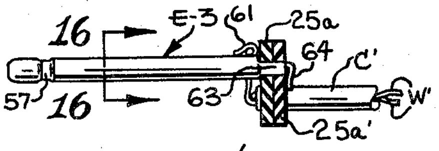
Figure 16:
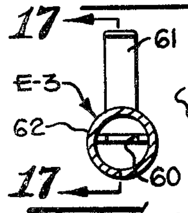
Figure 17:
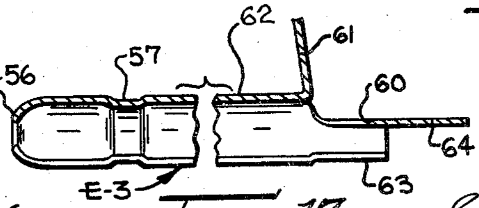

Figure 9 is a view similar to Figure 8 showing the jaws of the clamping device moved toward each other for alining the opposite ends of the two connector plates, showing the ends of terminal pins or electrodes inserted in some of the electrode-receiving holes, and also showing how the resilient cables or insulation for the wires is pinched or upset in each instance for clampingly securing the cables to the connector plates;

Figure 10 is an elevation of a second form of strain relief means removed from the terminal cap housing and showing the clamping plates as formed to accommodate a different form of terminal clip from that used with the electrodes in the first form of the invention and omitting some of the electrodes and wire-containing cables for purposes of clarity;

Figure 11 is a fragmentary longitudinal vertical sectional view, mostly on elevation, taken substantially along line 11—11 in Figure 10;

Figure 12 is an isometric view of one of the terminal clips used with the second form of strain relief means;

Figure 13 is a plan view similar to Figure 3 wherein the electrodes, cables and clamping plates are removed from the terminal cap housing and showing a third form of the invention wherein the terminal clips or tabs are formed as parts of the electrodes or terminal pins;

Figure 14 is a longitudinal vertical sectional view, mostly in elevation, taken substantially along line 14—14 in Figure 13;

Figure 15 is an elevation similar to Figure 7, but showing the type of connector plates used with the third form of the invention;

Figure 16 is an enlarged transverse sectional view through one of the terminal pins or electrodes taken substantially along line 16—16 in Figure 14;

Figure 17 is a longitudinal vertical sectional view through one of the terminal pins or electrodes of the third form of the invention and taken substantially along line 17—17 in Figure 16 and showing how the electrodes are formed prior to being assembled with the connector plates.

Referring more specifically to the drawings, the invention is illustrated herein as applied to an electrically heated blanket 10 as a means for making the electrical connection with a power supply which may be provided by an attachment cord 11 having a control 12 on one end thereof adapted to be connected to a conventional electric socket. The end of the cord 11 remote from the control 12 has a mating terminal unit or cap 13 thereon which is adapted to be connected to the improved terminal cap broadly designated at 14. The improved terminal cap 14 is shown in the form of a male terminal cap, although it is to be distinctly understood that the electrodes in each form of the invention disclosed herein may be of the female type.

The terminal cap 14 is in the form of a housing including an upper or top body section 15 and a bottom or lower body section 16. The body sections 15, 16 may be adhesively or otherwise secured together or may even be molded together, and it is preferable that these sections are each made from a molded plastic insulation material although it is to be distinctly understood that they each may be made from any desired type of electrically non-conductive material. The terms "upper" and "lower," "top" and "bottom" and "front" and "rear," as used herein, are used merely for purposes of establishing desired relationship between the various elements of the invention and are not to be considered as limitations, because it is apparent that the terminal cap may be inverted or placed in any desired attitude.

The lower or bottom body section 16 of the terminal cap 14 is preferably provided with a pair of laterally projecting ears 17 thereon to assist in anchoring the terminal cap 14 in a pocket 20 formed in the blanket 10. The pocket 20 may be formed in the blanket in a manner such as that shown in U. S. Patent No. 2,696,549, dated December 7, 1954, and issued to Fred W. Sturtevant. Of course, there are other ways in which the terminal cap 14 may be used and the ears 17 may even be omitted, if desired.

As is well known in the art, electric blankets are generally formed with a plurality of heating elements in the form of insulated resistance wires and, in Figures 3, 4, 5 and 7 of the first form of the invention, the insulation for the various wires is in the form of a resilient cable in each instance, each of the cables having two wires extending therethrough longitudinally thereof. Of course, a single wire may be enclosed in each of the cables. In the present invention, for instance, the terminal ends of four such cables are shown which are indicated at C. In this instance, each of the cables C encloses two wires W. Each of the cables C with its wires W may be of a type such as is disclosed in U. S. Patent No. 2,725,447, issued to Benjamin T. Fogler on November 29, 1955. Of course, other types of heating elements may be used just so long as the insulation covering or cable thereof is made from a resilient material such as rubber, neoprene, plastic or the like.

The improved strain relief comprises a pair of connector plates or rigid strain relief elements 25, 25' each of which is made from a suitable rigid insulation material such as plastic, wood or rubber. The connector plates 25, 25' are preferably relatively thin and of substantially identical rectangular configuration. However, they may be of different configuration provided that they are arranged so they can be moved relative to each other during the process of assembling the strain relief means, as will be later described. Each of the connector or strain relief plates 25, 25' is provided with two sets of apertures or holes therein. The holes in the first set each being indicated at 26 and the holes in the second set each being indicated at 27. The holes 26 may be termed as cable receiving holes and the holes 27 may be termed as electrode receiving holes.

The holes 26, 27 are preferably arranged in parallel rows as best shown in Figure 6. However, it will be apparent that the holes 26, 27 may be positioned in the same row or staggered relative to each other laterally of the longitudinal axis of each connector plates 25, 25' or arranged in various other ways just so long as the holes 26 in both the connector plates 25, 25' are alined with each other while the holes 27 in the plate 25 are disposed in equal off-set relationship to and in a common direction from the holes 27 in the plate 25'. It is also desirable that opposite ends or edges of the plates 25, 25' are disposed in off-set relationship an amount substantially equal to the off-set relationship of the adjacent holes 27 in the two plates 25, 25' as shown in Figure 7.

In the first form of the invention shown in Figures 1 through 9, the terminal pins or electrodes, of which five are shown in Figure 3, are each designated at E. Each of the electrodes or terminal pins E is provided with a pair of longitudinally spaced annular grooves 28, 29 and a reduced end portion 30 which is adapted to fit snugly through corresponding holes 27 provided therefor in the connector plates 25, 25'. A relatively thin substantially L-shaped terminal clip or lug 31 of conductive material has one of its legs penetrated by the reduced end portion 30 of each electrode E, the latter leg of the corresponding terminal pin or electrode 31 being positioned against the shoulder formed between the enlarged and reduced portions of the corresponding electrode E so the terminal clip 31 is clamped against the outer surface of the plate 25' when the free end of the reduced portion 31 of the corresponding electrode E is upset or peened, as at 32. This also serves to clamp the two connector plates 25, 25' together. As least one of the wires W is connected to the corresponding terminal clip as by soldering as indicated at 33 in Figures 3 and 4.

Now, in order to facilitate mass production of the connector plates 25, 25', both of the plates are preferably formed of the same external dimensions and the holes 26, 27 are originally formed through both of the connector plates or a plurality of such plates simultaneously in coaxial alinement. Thereafter, one of the plates for each pair is turned over so the holes in only one of the rows in one connector plate will be axially alined with the corresponding row of holes in the other of the plates. To this end, it will be observed in Figures 3, 6 and 7 that both of the connector plates 25, 25' are of substantially or identically the same length and the cable-receiving holes 26 are disposed in a row and are disposed in equally spaced relationship. Also, the electrode-receiving holes 27 are formed in a row wherein all of the electrode-receiving holes 27 are disposed in equally spaced relationship. The endmost holes 27 are spaced equal distances from the adjacent edges of each plate as indicated at X in Figure 6. However, the endmost hole 26 adjacent the left-hand end edge of the plate 25 is spaced a distance Y from said left-hand end edge of the connector plate 25 while the right-hand endmost hole 26 is spaced a distance Z from the right-hand edge of the plate 25 and the distance Y is somewhat greater than the distance Z.

Thus, when a plurality of such plates are formed in the manner shown in Figure 6 and any one or more of them is turned over relative to others, the holes 26 in the plates which have been turned over may register with holes in the plates that have not been turned over, but then, the holes 27 in the plates which have been turned over will be disposed in common off-set relationship to holes 27 in plates which have not been turned over, as shown in Figure 7, or vice versa.

Now, in carrying out the improved method of assembling the connector plates 25, 25' and electrodes E so as to clampingly secure the conductors C to the connector plates 25, 25', the cable-receiving holes in the connector plate 25 are alined with the cable-receiving holes 26 in the second connector plate 25' so that opposite ends of the two connector plates are disposed in off-set relationship as shown in Figures 7 and 8. The terminal ends of the cables C, with the corresponding wires W extending therefrom, are then inserted, one through each of the holes 26 in the plate 25′ and through the corresponding hole 26 alined therewith in the plate 25. Thereafter, the plates 25, 25′ with the cables therein are forced to move longitudinally of each other, as by means of a pair of clamping jaws or vise jaws J, each engaging one end of one of the connector plates 25, 25′ until the connector plates 25, 25′ are alined as shown in Figure 9. Of course, this alines the holes 27 in the plate 25 with the corresponding holes 27 in the connector plate 25′ while causing the holes 26 in the plate 25 to be moved out of alinement with the holes 26 in the plate 25′ and to thereby upset or "pinch" the cables C at the junctures of the walls of the adjacent holes 26 in the two plates 25, 25′.

While the connector plates 25, 25′ are clamped, as shown in Figure 9, the reduced ends 30 of terminals E, on which reduced ends the terminal clips 31 have previously been positioned, are inserted in the then alined holes 27 of the two plates 25, 25′, whereupon the plates 25, 25′ are clamped together and the electrodes E secured thereto by peening at 32, as heretofore stated.

This completes the basic assembling of the strain relief. However, after the components are assembled, as shown in Figure 9, the wires W are soldered or otherwise connected to the proper terminal clips 31 and/or electrodes E after which the connector plates or bars 25, 25′ and the adjacent ends of the electrodes E and cables C are positioned between the body sections 15, 16 of the terminal cap 14.

It will be observed in Figures 2, 3, 4 and 5 that the front proximal portions of the body sections 15, 16 are provided with grooves 35 through which the electrodes E extend and, in order to accommodate the terminal clips 31, the solder 33 and the exposed end of the wires W, the proximal portions of the upper and lower body sections 15, 16 are formed with a chamber 36 therein whose bottom is formed with a groove 37 which is preferably of a width substantially the same as the combined thickness of the two connector plates 25, 25′ to assist in tightly securing the connector plates to the terminal cap 14. Also, the distance from the bottom of the groove 37 to the upper wall of the chamber 36 is preferably substantially the same as the width or height of the connector plates 25, 25′ to further assist in clamping the connector plates 25, 25′ between the two body sections 15, 16.

As best shown in Figures 4 and 5, the rear proximal portions of the body sections 15, 16 are also provided with grooves 40 therein which are off-set relative to the grooves 35 and through which the terminal portions of the cables C extend. The upper surface of the rear portion of the bottom or lower body section 16 is preferably provided with a transverse upwardly extending projection 41 which fits in a mating groove in the bottom rear portion of the upper body section 15 to assist in preventing relative movement between the two body sections 15, 16.

The upper body section or cover 15 may be secured to the lower body section 16 by any suitable means such as a suitable adhesive or the body sections 15, 16 may be heat-sealed together. It is preferable that the lower body section 16 is provided with a plurality of upwardly projecting relatively small projections or pilot portions 42 each of which mates with a corresponding hole 43 in the cover or upper body section 15 to further assist in properly alining the two sections 15, 16 when they are assembled and to assist in securing the said sections together.

*Second form of the invention*

The form of the invention shown in Figures 10, 11 and 12 is similar to the first form of the invention shown in Figure 1 through 9 and, although the body sections 15, 16 of the terminal cap are omitted in Figures 10 and 11 it is apparent that the electrodes, connector plates, terminal clips and terminal portions of the cables shown in Figures 10 and 11 fit in a housing identical to the housing formed from the body sections 15, 16 shown in Figures 2, 3, 4 and 5. Accordingly, an illustration of the housing in association with the parts shown in Figures 10, 11 and 12 is deemed unnecessary.

The form of the invention shown in Figures 10, 11 and 12 differs from that shown in Figures 1 through 9 only in the manner in which the electrodes are connected to the connector plates and in the manner in which the terminal clips are formed and, therefore, those parts in Figures 10, 11 and 12 which are identical or substantially the same as parts shown in Figures 2 through 9 will bear the same reference characters in order to avoid repetitive description.

The electrodes in Figures 10 and 11 are each broadly designated at E–2 and each electrode or terminal pin E–2 comprises an enlarged body portion 44 provided with a pair of longitudinally spaced annular grooves 38, 39 therein. The rear end of each electrode E–2 is formed with a relatively short reduced portion 45, the reduced portion 45 of each of the electrodes E–2 fitting in the alined holes 27 in the corresponding connector plates 25, 25′ in exactly the same manner in which the reduced portions 30 of the electrodes E fit in the holes 27 of the corresponding plates 25, 25′. However, the reduced portion 45 on each electrode E–2 is substantially longer than the reduced portion 30 on each electrode E relative to the thickness of the connector plates 25, 25′ and a medial portion of each reduced portion 45 is provided with an annular groove 46 in which the bifurcated substantially vertical leg 47 of a second form of terminal clip 50 fits. The terminal clip 50 is substantially L-shaped and also includes a substantially horizontal leg 51 provided with a pair of notches 52 on opposite sides thereof to facilitate connecting and soldering the corresponding wires extending from the cables C thereto, as at 53 (Figure 11). The terminal clip 50 is preferably made from a yieldable material such as spring copper alloy or brass, and a medial portion of the bifurcated leg 47 of each terminal cilp 50 is formed with an outwardly projecting portion 54 therein which bears against the shoulder formed by groove 46 in the reduced portion 45 of the corresponding electrode E–2 to thereby maintain the shoulder formed at the juncture of the reduced portion 45 and the body portion 44 of each electrode E–2 in engagement with the front surface of the corresponding connector plate 25.

*Third form of the invention*

The third form of the invention shown in Figures 13 through 17 differs from the first and second forms of the invention in the manner in which the electrodes or terminal pins are formed in the manner in which they are connected to the connecting plates. Accordingly, the housing, such as the sections 15, 16 shown in Figure 2, has been omitted in Figures 13 through 17. It will be observed in Figure 15 that the connector plates of the third form of the invention are formed in substantially the same manner as the connector plates 25, 25′ of the first and second forms of the invention. The connector plates in Figures 13, 14 and 15 are indicated at **25*a* and 25*a*′ and differ from the connector plates 25, 25′ only in that the electrode-receiving holes formed therein are substantially semi-circular or segmental-circular and each of the electrode-receiving holes in each of the connector plates 25*a*, 25*a*′ is indicated at 27*a*. The cable-receiving holes in the connector plates 25*a*, 25*a*′ are indicated at 26*a*, but are formed in exactly the same shape and manner of the holes 26 in the connector plates 25, 25′**. The cables in Figures 13 and 14 are indicated at C′ and are secured in the mating holes 26*a* in the two connector plates 25*a*, 25*a′* in the same manner in which the cables C are connected to the plates 25, 25′ of the first form and second form of the invention.

The electrodes of the third form of the invention are each broadly designated at E–3 and are each formed from an elongated tubular member whose free end is formed inwardly to form a rounded nose 56 thereon. An annular groove 57 is also formed adjacent the free end of each electrode or terminal pin E–3. The grooves 57 are similar to the grooves 28, 38 formed in the respective electrodes E, E–2 of the first and second forms of the invention and are provided for the usual purpose of locking the terminal pins or electrodes in engagement with the mating elements, not shown, of the external connecting unit 13.

The grooves 29, 39 (Figures 3 and 11) merely assist in locking the respective terminal pins E, E–2 in the grooves 35 formed in the body sections 15, 16 and may be omitted, if desired.

Now, instead of providing a terminal clip such as either of the clips 31, 50 of Figures 4 and 11 for the third form of electrode or terminal pin, each of the electrodes E–3 is formed with a slot 60 adjacent its rear end remote from the rounded end 56 thereof. The latter end may also be termed as the operating or locking end of each electrode E–3. The material cut away in forming the slot 60 is bent upwardly to form a terminal clip portion or terminal tab 61 integral with the body 62 of the terminal pin or electrode E–3. After the terminal clip portion 61 has been turned outwardly substantially as shown in Figures 16 and 17, the surface of the body 62 adjacent and outwardly of the terminal clip portion 61 is flattened to form a reduced substantially semi-circular or segmental-circular locking end portion 63 thereon of substantially the same size and shape as each hole 27*a* in the plates 25*a*, 25*a′*. Thereafter, the lower or rounded portion of the substantially semi-circular locking end portion 63 of the electrode E–3 is partially cut away to form a locking tab or ear 64 extending from the semi-circular locking portion 63.

Thus, after cables C′ containing wires W′ are inserted in the holes 26*a* in the two connector plates 25*a*, 25*a′*, the connector plates are moved relative to each other to aline the segmental-circular or semi-circular holes 27*a* in the connector plate 25*a* with the corresponding semi-circular or segmental-circular holes 27*a* in the connector plate 25*a′* and to thereby cause the holes 26*a* in the connector plate 25*a* to be disposed out of alinement with the holes 26*a* in the connector plate 25*a′* to clampingly secure the cables C′ to the connector plates 25*a*, 25*a′*. This operation may be performed in the manner described heretofore with respect to Figures 8 and 9.

Thereafter, the reduced substantially semi-circular locking end portions 63 of the electrodes E–3 are inserted through the then alined holes 27*a* in the two connector plates 25*a*, 25*a′*, after which the locking tab 64 is bent laterally either toward or away from the adjacent cables C′ as best shown in Figure 14 to cause the shoulder formed at the juncture of the body section 62 and the reduced portion 63 to tightly bear against the outer or rear surface of the connector plate 25*a*. This, of course, also causes the terminal portion or tab 61 to bear against the outer surface of the plate 25*a*. One or more of the adjacent wires W′ extending out of the terminal ends of adjacent cables C′ are then positioned against the terminal portion or tab 61 at its juncture with the body 62 and the corresponding terminal tab 61 is then bent downwardly substantially as shown in Figure 14, after which the wires may be soldered or otherwise fused to the terminal tabs 61 of the electrodes E–3 to complete the assembly thereof preparatory to positioning the same in a housing such as that embodied in the body sections 15, 16 in Figures 2, 3, 4 and 5.

It is thus seen that I have provided a novel method and means for connecting resilient cables having wires therein with corresponding electrodes so the wires extending from the terminal ends of the cables and connected to the terminals are not placed under undue stresses, although there may be considerable pulling force applied to the free ends of the electrodes and to the wires or cables. Under practically all normal conditions, the pulling forces applied on the cables and electrodes would be insufficient to cause the cables to be pulled out of the corresponding cable receiving holes in the corresponding connector plates, thus insuring that the wires extending out of the terminal ends of the cables are not placed under undue stresses or pulled free of the terminal clips or electrodes.

In the drawings and specification there have been set forth preferred embodiments of the invention and, although specific terms are employed, they are used in a generic and descriptive sense only and not for purposes of limitation, the scope of the invention being defined in the claims.

I claim:

1. Means to connect wires extending out of resilient cables to rigid electrodes comprising a pair of plates having coinciding holes therethrough in which ends of the electrodes are snugly positioned and secured, said plates having other holes therethrough of substantially the same size as the resilient cables and in which terminal portions of said cables are positioned, said other holes in one plate being off-set relative to said other holes in the other plate whereby the cables are squeezed at the juncture of the two plates, and said wires extending out of the terminal ends of the cables and being attached to certain of the electrodes.

2. Strain relief means for connecting at least one wire having a resilient covering thereon with at least one rigid electrode comprising a pair of juxtaposed connector elements having off-set holes formed therein for receiving the resilient covering on the corresponding wire therein whereby the resilient covering is squeezed at the juncture of the connector elements, and said electrode extending through and in snug engagement with both of said connector elements to maintain the holes in the two connector elements, through which the resilient covering extends, in off-set relationship, said wire extending outwardly beyond the resilient covering and being connected to the electrode.

3. An electrical connector for a plurality of resilient cables each having at least one wire extending therethrough comprising a body of insulation material having a plurality of substantially parallel passageways in its rear portion for receiving said cables, said body having a chamber formed in its medial portion, a pair of juxtaposed insulation connector plates fixed in said chamber and being provided with cable-receiving holes for the respective cables, the cable-receiving holes in one of said plates being off-set with respect to corresponding holes in the other of said plates, whereby the cables are upset at the juncture of the connector plates, a plurality of electrodes having their rear ends snugly penetrating said plates and extending forwardly from said connector plates, the body also being provided with spaced parallel passageways through which the electrodes extend, and said wires extending out of the cables and being connected to certain of said electrodes.

4. An improved terminal pin support, conductor clamp and connection assembly for a plurality of pins and conductors adapted to be enclosed within an electric blanket terminal cap housing comprising a pair of rectangular duplicate thin plates having flat mating surfaces, a first set of mating holes axially misalined in the longitudinal direction of the plates and through which leading ends of the conductors extend, a second set of mating axially alined holes through which terminal ends of the pins snugly extend, the conductors entering at one side of the pair of plates and the pins entering at the other side of the pair of plates, the pins holding the first set of holes in axial misalinement and the second set of holes in axial alinement thereby pinching and securing the conductors within the first set of holes, connections between the pins and conductors, and means on said pins for securing the pins to the plates and holding the mating surfaces of the plates in clamped position against each other.

References Cited in the file of this patent

UNITED STATES PATENTS

| | | |
|---|---|---|
| 2,031,564 | Knutson | Feb. 18, 1936 |
| 2,134,350 | Woolley | Oct. 25, 1938 |
| 2,464,405 | Knauf | Mar. 15, 1949 |